UNITED STATES PATENT OFFICE.

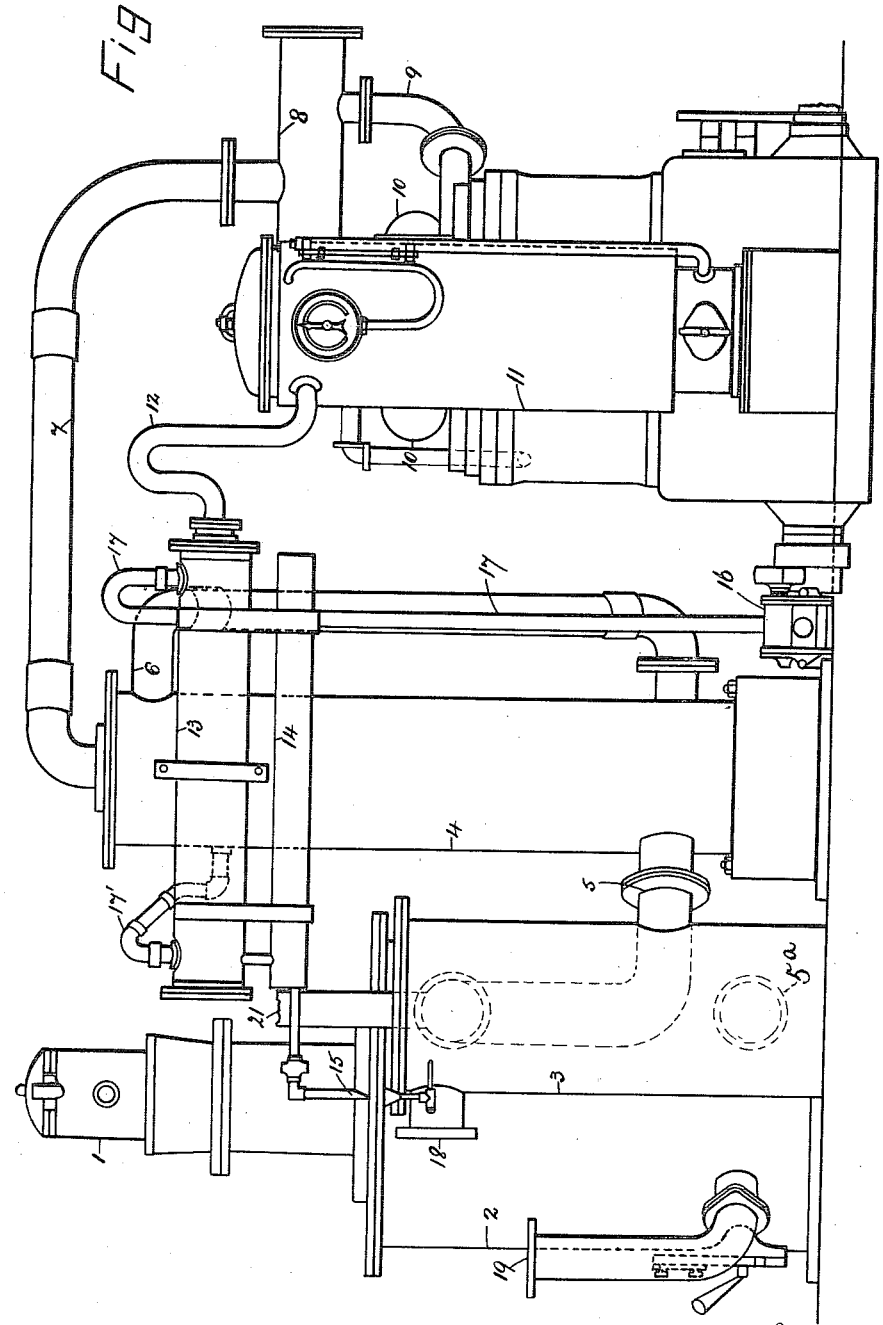

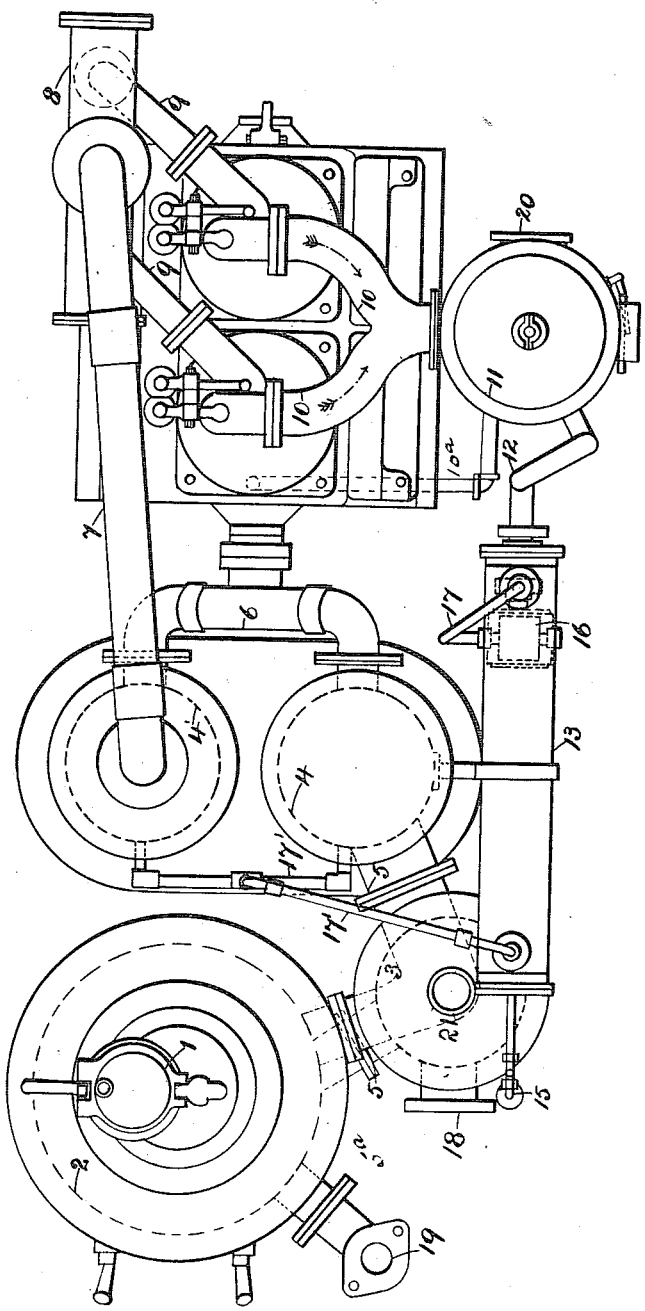

THOMAS HEATH OSWALD AND THOMAS HEATH OSWALD, JR., OF LONDON, ENGLAND.

SUCTION GAS PLANT AND ENGINE.

986,206.

Specification of Letters Patent.

Patented Mar. 7, 1911.

Application filed June 12, 1909. Serial No. 501,802.

*To all whom it may concern:*

Be it known that we, THOMAS HEATH OSWALD and THOMAS HEATH OSWALD, Jr., subjects of the King of Great Britain, and residents of 153 Fenchurch street, London, in the county of Middlesex, England, have invented a new and useful Improvement in Suction Gas Plants and Engines, of which the following is a specification.

This invention relates to power producing plants for use on board ship and the like, and it has more particular reference to that type of plant comprising a gas producer apparatus and an engine or engines adapted for operation by means of the gas generated by the said producer apparatus and employed for propelling or auxiliary purposes.

Plants of the kind above referred to, as heretofore constructed and arranged, have all proved more or less objectionable and disadvantageous in use owing to the great difficulty experienced in maintaining an adequate or unlimited supply of fresh water for use in the gas producer apparatus.

The object of our invention is to overcome the foregoing serious disadvantage by providing a power producing plant which is self-contained, or, in other words, is adapted for continuous working, inasmuch as the necessary supply of fresh water is produced and steadily maintained, by the plant itself, thereby obviating the necessity for separate fresh water storage tanks.

Our invention principally consists in utilizing the waste heat of the gases exhausting from the engine cylinder or cylinders, as well as the heat carried off from such cylinders by the cooling water circulating through the cylinder jackets, for the purpose of evaporating sea water and converting it into fresh water for use in the process of generating suction or power gas.

The present improvements further consist in the general arrangement and combination of the various parts constituting our improved apparatus for power producing purposes.

In order that our invention may be clearly understood we will now describe the same with reference to the accompanying drawings, in which, Figure 1 represents in elevation one practical form of power producing plant embodying our improvements, and Fig. 2 is a plan of the same.

According to the form of apparatus illustrated, 1 is the feed hopper for the gas generator 2 which is connected to the vaporizing chamber 3 in any of the well known ways, preferably by a pipe $5^a$ leading from the bottom of the vaporizing chamber 3 to the bottom of the generator 2 below the grate bars.

4, 4' are the scrubbers which are preferably filled with coke, and the former is in communication with the generator 2 through the connecting pipe 5, which passes through the vaporizing chamber.

6 is the outlet pipe leading from the top of the first scrubber 4 to the bottom of the second scrubber 4', and 7 is the gas main from said scrubber 4' to the storage chamber 8 for the engines.

9, 9, are the connecting pipes from the chamber 8 to the engine cylinders.

The gases exhausting from the engine cylinders are conveyed away by the forked pipe 10 to the salt water evaporator 11 and through which they are circulated.

12 is the conduit or discharge pipe for the steam generated in the evaporator 11 to the condenser 13 which is arranged in close proximity to, as well as in connection with, the fresh water storage tank 14.

15 is a supply pipe from the tank 14 conveying fresh water to the vaporizing chamber 3 above referred to, and it is preferably fitted with an outflow regulating valve.

16 is a circulating pump of any approved type for circulating the cooling water through the condenser and impelling it onward into the scrubbers 4, 4', for cooling purposes, and 17, 17' are respectively connecting pipes from said pump 16 to the condenser 13 and from the latter to the said scrubbers 4, 4'.

Air is admitted into the vaporizing chamber 3 at 18, and 19 is a connecting pipe from a suitable fan or fans—not shown—for creating a draft in the generator 2.

20 is the exhaust outlet for the spent gases circulating through the heating chamber of the salt water evaporator 11, and 21 is a discharge pipe extending into the vaporizing chamber 3, and connected at one end to the pipe 5, and at its other end extending into the atmosphere or the ship's funnel. This pipe is provided with a cock, not shown, the pipe forming an open communication, through the cock referred to, when the plant is standing or when the fire is being started and blown up by the fan referred to, but which pipe is closed through the cock when the plant is running.

From the foregoing it will be seen that by arranging the sea-water evaporator 11 in close proximity to the engine so that the exhaust passages leading from said engine cylinder or cylinders are connected with and open to the heating surface of said evaporator, the hot gases exhausted from the cylinder or cylinders will raise the temperature of the water contained in the evaporator 11 to the necessary degree for converting it into steam, which is subsequently condensed into fresh water in the condenser 13.

The combination and arrangement of the engine or engines with the evaporator 11 is also such that the sea water passed through the cylinder jacket or jackets as cooling water is subsequently utilized for purposes of evaporation by being passed through the pipe 10ᵃ into the evaporating chamber, where it is evaporated and finally condensed as above set forth.

By combining the evaporator 11 with the condenser 13 and connecting the latter with a steam generator and a vaporizing chamber 3 through which passes the connecting pipe 5 from the gas generator 2 to the scrubber 4 it is insured that the fresh water contacting with said connecting pipe 5 becomes vaporized by the heat radiating therefrom, the vapor so produced being mixed with air entering at 18 ready for passage to the gas generating furnace by any suitable pipe connection illustrated in dotted lines at 5ᵃ.

The arrangement of the condenser 13 in combination with the scrubbers 4, 4′ provides an effective means for utilizing the cooling water flowing from said condenser 13 for cooling and washing the gas passing through the scrubber.

Although we have outlined one form of apparatus for carrying out our invention we wish it to be clearly understood that we do not confine ourselves to the particular arrangement and combination of parts described and shown as the disposition of the sea water evaporator relative to the engine or engines, condenser, vaporizing chamber, or producer furnace, the condenser relative to the scrubbers, and so forth, may be considerably varied to meet different working conditions, as well as to adapt the general arrangement of the whole apparatus according to the location of the engines without in any way departing from the nature of our improvements.

It is furthermore to be clearly understood that we lay no claim to any particular part or separate portion of the entire apparatus by itself, all of which may be varied according to well known forms and types, but that our invention consists essentially in the general arrangement and combination of parts for the purposes set forth.

What we claim as our invention, and desire to secure by Letters Patent, is:—

1. In an apparatus of the character described, the combination of a gas generator, a scrubber, a gas storage chamber, a conduit from said scrubber to said gas storage chamber, an evaporator, a condenser connected with said evaporator, a fresh water storage chamber connected with said condenser, means circulating cooling water through said condenser, and means for conducting said cooling water to said scrubber, substantially as described.

2. In an apparatus of the character described, the combination of a generator, a vaporizer, a scrubber, a gas storage chamber, an evaporator and a condenser, a conduit between said vaporizer and generator, a conduit between said generator and scrubber, said latter conduit passing through said vaporizer, a conduit between said scrubber and said gas storage chamber, a conduit between said evaporator and said condenser, means for introducing water to said evaporator, means for heating said evaporator, means for circulating cooling water through said condenser, a conduit between said condenser and said vaporizer, a conduit between the cooling jacket of said condenser and said scrubber, and means for introducing fresh air to said vaporizer, substantially as described.

3. In an apparatus of the character described, the combination of a gas generator, a scrubber, an internal combustion engine, a conduit from said scrubber to said engine, an evaporator comprising a heating chamber and an evaporating chamber, a condenser connected with said evaporating chamber, a fresh water storage chamber connected with said condenser, means circulating cooling water through said condenser, means for conducting said cooling water to said scrubber, means for leading the cooling water from the water jacket of said engine to said evaporating chamber, and means for heating said evaporator heating chamber, substantially as described.

4. In an apparatus of the character described, the combination of a gas generator, a scrubber, an internal combustion engine, a conduit from said scrubber to said engine, an evaporator comprising a heating chamber and an evaporating chamber, a condenser connected with said evaporating chamber, a fresh water storage chamber connected with said condenser, means circulating cooling water through said condenser, means for conducting said cooling water to said scrubber, means for leading the cooling water from the water jacket of said engine to said evaporating chamber, and a conduit leading the exhaust gases from said engine to the heating chamber of said evaporator, said heating chamber being provided with an exhaust outlet, substantially as described.

5. In an apparatus of the character described, the combination of a generator, a vaporizer, a scrubber, an explosive engine, an evaporator having a water and a heating chamber, and a condenser having a cooling jacket, a conduit between said scrubber and said explosive engine for leading gas thereto, a conduit between the water jacket of said engine and the water chamber of said evaporator for introducing partially heated water therein, a conduit leading from the exhaust of said engine to said heating chamber, said heating chamber being provided with an outlet for the exhaust gases, a conduit between said water chamber and said condenser for carrying the generated steam thereto, means for supplying and circulating cooling water through the water jacket of said condenser, a conduit for conducting the cooling water from said jacket to said scrubber for cooling and washing the generated gas, a conduit between said condenser and said vaporizer for conducting fresh water thereto, an air inlet for said vaporizer, a conduit from said generator to said scrubber, passing through said vaporizer and causing the water therein to vaporize and mix with said air, and means conducting said mixture of vaporized water and air to said generator, substantially as described.

6. The combination, in power producing plants, of a gas generator, a vaporizing chamber connected therewith, a scrubber connected with said generator through said vaporizing chamber, an internal combustion engine, a gas storage chamber for the cylinders of said engine, a conduit between said scrubber and gas storage chamber, a salt water evaporating chamber, a conduit between the water jacket of said gas engine and said evaporating chamber, means for heating said evaporating chamber by the exhaust gases from said engine, a condenser in communication with said evaporating chamber, a fresh water storage tank in connection with said condenser, means for circulating cooling water through said condenser and discharging same into said scrubbers, and means for supplying air to said vaporizing chamber and said generator, substantially as described.

In witness whereof we have hereunto set our hands in the presence of two witnesses.

THOMAS HEATH OSWALD.
THOMAS HEATH OSWALD, Jr.

Witnesses:
ARTHUR E. EDWARDS,
D. K. BOYLE.